United States Patent
Cragun et al.

(10) Patent No.: US 9,471,923 B2
(45) Date of Patent: Oct. 18, 2016

(54) PROVIDING LICENSED CONTENT TO A USER

(75) Inventors: Brian J. Cragun, Rochester, MN (US); John E. Petri, St. Charles, MN (US)

(73) Assignee: International Business Machines Corporation, Armonk, NY (US)

( * ) Notice: Subject to any disclaimer, the term of this patent is extended or adjusted under 35 U.S.C. 154(b) by 1328 days.

(21) Appl. No.: 12/858,587

(22) Filed: Aug. 18, 2010

(65) Prior Publication Data

US 2012/0046957 A1    Feb. 23, 2012

(51) Int. Cl.
*G06F 21/00* (2013.01)
*G06Q 20/42* (2012.01)
*G06Q 30/06* (2012.01)

(52) U.S. Cl.
CPC .............. *G06Q 20/42* (2013.01); *G06Q 30/06* (2013.01)

(58) Field of Classification Search
CPC ................................ G06Q 20/1235
USPC .......................................... 705/59
See application file for complete search history.

(56) References Cited

U.S. PATENT DOCUMENTS

| | | | |
|---|---|---|---|
| 5,892,900 A | 4/1999 | Ginter et al. | |
| 7,660,742 B2 | 2/2010 | Biwer et al. | |
| 2004/0205358 A1* | 10/2004 | Erickson | G06F 21/10 726/33 |
| 2005/0278258 A1 | 12/2005 | O'Donnell et al. | |
| 2008/0141378 A1* | 6/2008 | McLean | G06F 21/10 726/26 |
| 2012/0278866 A1* | 11/2012 | Huang | G06F 21/51 726/4 |

OTHER PUBLICATIONS

U.S. Appl. No. 12/101,259; entitled "Controlling Modification of Components in a Content Management System;" filed Apr. 11, 2008 by Cragun et al.
U.S. Appl. No. 12/101,262; entitled "Controlling Reuse of Components in a Content Management System;" filed Apr. 11, 2008 by Cragun et al.

* cited by examiner

*Primary Examiner* — Charles C Agwumezie
(74) *Attorney, Agent, or Firm* — Martin & Associates, LLC; Derek P. Martin (57) ABSTRACT

When a user requests licensed content, a dynamic licensing mechanism automatically requests and receives licenses for the licensed content when one or more criterion in a licensing policy is satisfied by license information relating to the content, without the user providing any further input to acquire the licenses.

21 Claims, 8 Drawing Sheets

| Sample License Info | |
|---|---|
| Price per object | — 422 |
| Price per time viewed | — 424 |
| Price per time of day viewed | — 426 |
| Price for Quick Peek | — 428 |
| Price for Bulk License | — 430 |
| Price for Flat Rate License | — 432 |
| Price for Sliding Scale License | — 434 |
| Preferred License Information | — 436 |
| Available Discount Information | — 438 |

| Sample Licensing Policy | |
|---|---|
| Max Cost per object | — 522 |
| Max Cost per time viewed | — 524 |
| Max Cost per time of day viewed | — 526 |
| Max Cost for Quick Peek | — 528 |
| Max Cost for Bulk License | — 530 |
| Max Cost for Flat Rate License | — 532 |
| Max Cost for Sliding Scale License | — 534 |
| Preferred License | — 536 |
| Max Cost per Document | — 538 |
| Max Cost per day for user | — 540 |
| Content Substitution Tradeoff | — 542 |
| Cost Increase Specification | — 544 |
| Available Discounts Specification | — 546 |

| Document A License Info ||
|---|---|
| Content | License Info |
| Image001 | Price per object = $0.25 |
| | Price for Quick Peek = $0.05 |
| | Price of Bulk License from Content Provider L = $15/year |
| | Price of Flat Rate License from Content Provider L = $2/month |
| | Price for Sliding Scale License = $0.25 per object, at 100 objects price reduces to $0.15 per object |
| Image002 | Price per object = $0.10 |
| | Price of Bulk License from Content Provider M = $1/month or $10/year |
| Text003 | Price per object from 8AM-5PM = $0.20 |
| | Price per object from 5PM-8AM = $0.08 |
| Audio Clip 004 | Free if user provides e-mail address |
| Video Clip 005 | Price per object $0.05 |
| | Price of Bulk License from Content Provider P = $20/year |
| Video Clip 006 | Price per object $0.10 |
| | Price of Bulk License from Content Provider P = $20/year |
| Video Clip 007 | Price per object $0.25 |
| | Price of Bulk License from Content Provider P = $20/year |
| Text008 | Price per object $0.05 |
| Audio Clip 009 | Price per object $0.05 |
| | Price of Bulk License from Content Provider R = $10/year |
| Audio Clip 010 | Price per object $0.10 |
| | Price of Bulk License from Content Provider S = $15/year |
| Audio Clip 011 | Price per object $0.07 |
| | Price of Bulk License from Content Provider T = $25/year |
| Link1 | Price per object from 9AM-6PM = $0.10 |
| | Price per object from 6PM-9AM = $0.05 |
| Link2 | Price per object $0.15 |
| | Price of Bulk License from Content Provider V = $12/year |
| Link3 | Free |

| User J Licensing Policy |
|---|
| Max Cost per object = $0.10 — 822 |
| Max Cost per time viewed = $0.05/min — 824 |
| Max Cost per time of day received = $0.20 peak, $0.10 off-peak — 826 |
| Max Cost for Quick Peek = $0.05 — 828 |
| Max Cost for Bulk License = $2/month, $20/year — 830 |
| Max Cost per Document = $2 — 832 |
| Max Cost per day for User J = $10 — 834 |
| Prefer Content with Existing License — 836 |
| Provide User Info to Obtain License — 838 |
| Allow Less Expensive Content Substitution — 840 |
| Prefer Content that is Discounted Based on Browser and Plugins — 842 |

| Charges to User J for Document A | | |
|---|---|---|
| Content | Provider | Cost |
| Image001 | L | $0.05 |
| Image002 | M | $0.10 |
| Text003 | N | $0.08 |
| Video Clip 005 | P | $0.05 |
| Text008 | Q | $0.05 |
| Audio Clip 009 | R | $0.05 |
| Audio Clip 010 | S | $0.10 |
| Audio Clip 011 | T | $0.07 |
| Link1 | U | $0.10 |
| Link3 | W | 0.00 |
| | Total | $0.65 |

FIG. 10

PROVIDING LICENSED CONTENT TO A USER

BACKGROUND

1. Technical Field

This disclosure generally relates to a system for providing content to a user, and more specifically relates to a system for providing licensed content to a user.

2. Background Art

Computers are very useful for storing and retrieving information. The popularity of the Internet has changed how many people live due to the large amount of information that is readily available on virtually any subject of interest. For example, many people when confronted with medical symptoms will first search online for information regarding the symptoms and recommended courses of treatment before consulting their doctor. In addition, many people have changed how they receive their news. Where a person a generation ago would get their news from a daily newspaper and the evening news program on television, more and more people choose to receive their news online.

The widespread popularity of the Internet has given rise to the need to deliver licensed content to users upon request. The term "licensed content" as used herein is any content that requires the user to do something in exchange for receiving the content. One form of licensed content is paid content. For example, many web sites provide content in exchange for the user paying a fee. If a user pays the fee, the user may then access the information on the website. Another form of licensed content is free content that is provided in exchange for the user agreeing to certain conditions. For example, the user might be required to enter his or her e-mail address in order to access the licensed free content. In the alternative, the user may be required to agree to view advertisements in order to access the licensed free content. Yet another form of licensed content is content provided by one web site when the user is a paid subscriber to a different partner web site. Of course, there are many other possibilities for licensed content. The disclosure and claims herein expressly extend to any suitable form of licensed content that is provided to the user upon the user satisfying one or more conditions, whether the licensed content is currently known or developed in the future.

Some web sites and other content providers now provide licensed content from a number of different sources. This complicates the process of providing the content to a user because the content provider must check to see if the user is licensed to receive the licensed content from each of the licensed sources. If the user is not licensed, the licensed content is not provided to the user. If the user is trying to access a document that includes licensed content from ten different content providers, and the user has a license for only two of those ten content providers, the user may become very frustrated at the inability to access the information from then non-licensed content providers, and may not know what steps to take, or even who is the provider of the missing content.

One possible way to mitigate the frustration of a user at receiving licensed content is to provide the licensed content on a per-object basis. However, users have historically shied away from per-object pricing, preferring a flat fee model. One reason for this is the uncertainty at the final cost of receiving the licensed content. A user may be willing to pay a higher flat fee instead of paying on a per-object basis so the user is certain of the charges. Without a way to automate the process for a user to obtain licensed content, the process for the user to access licensed content from multiple sources will be inefficient and frustrating for the user.

BRIEF SUMMARY

A dynamic licensing mechanism uses a licensing policy specified by a user. When a document requested by a user includes licensed content that the user is not licensed to receive, the dynamic licensing mechanism queries the content provider to determine license information regarding what licenses are available for the content the user is not licensed to receive. If the license information satisfies criteria specified in the licensing policy, the dynamic licensing mechanism automatically performs the steps required to receive a license to the content, which may include authorizing payment, sending the user's e-mail address or other information, etc., without any further interaction required by the user. When the dynamic licensing mechanism can successfully acquire a license for all content in the document because the available licenses satisfy the licensing policy, the content provider then provides the full document to the user with all its licensed content. When the dynamic licensing mechanism cannot successfully acquire a license for all content in the document because the available licenses do not satisfy the criteria in the licensing policy, the dynamic licensing mechanism may prompt the user with the information regarding what is required to access the licensed content. If the user authorizes to receive the licensed content that did not satisfy the licensing policy, the dynamic licensing policy acquires the needed license(s) and delivers the full document. If the user does not authorize to receive the licensed content that did not satisfy the licensing policy, the content provider may send to the user the document without the content that did not satisfy the licensing policy. In the alternative, the content provider may determine the user cannot receive any of the document because the user is not licensed to access all of the licensed content in the document.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and.

DETAILED DESCRIPTION

The claims and disclosure herein provide a dynamic licensing mechanism that determines license information for content requested by a user, determines whether the license information satisfies a licensing policy specified by the user, and if so, automatically acquires the license(s) for the content so the content may be delivered to the user by the content provider without the user having to take any action after requesting the document to obtain the license(s).

Figure 1:
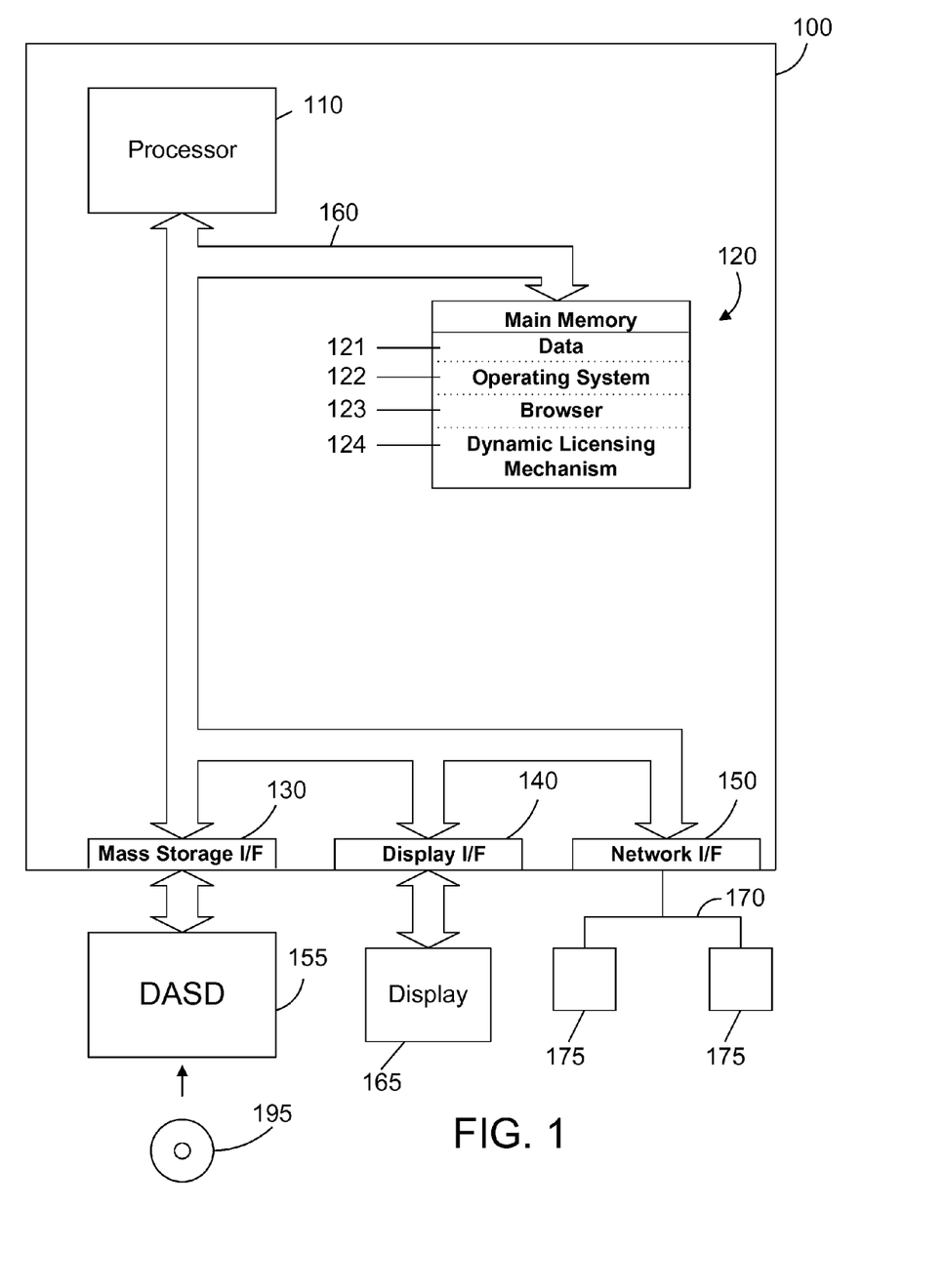
FIG. 1 is a block diagram of an apparatus that includes a dynamic licensing mechanism.

Referring to FIG. 1, a computer system 100 is one suitable implementation of a computer system that includes a dynamic licensing mechanism that automatically acquires licenses for licensed content if the license information regarding available licenses for the licensed content satisfy a licensing policy specified by a user. Computer system 100 is an IBM eServer System i computer system. However, those skilled in the art will appreciate that the disclosure herein applies equally to any computer system, regardless of whether the computer system is a complicated multi-user computing apparatus, a single user workstation, or an embedded control system. As shown in FIG. 1, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices, such as a direct access storage device 155, to computer system 100. One specific type of direct access storage device 155 is a readable and writable CD-RW drive, which may store data to and read data from a CD-RW 195.

Main memory 120 preferably contains data 121, an operating system 122, a browser 123, and a dynamic licensing mechanism 124. Data 121 represents any data that serves as input to or output from any program in computer system 100. Operating system 122 is a multitasking operating system. Browser 123 is a mechanism that may be used by a user to request content from a content provider. If the content is in the form of a web page, the browser 123 may be a known web browser, such as Microsoft Explorer, Mozilla Firefox, or Google Chrome. Note, however, the term "browser" used herein broadly encompasses any mechanism that allows a user to request content from a content provider, whether currently known or developed in the future. Thus, an operating system on a mobile phone is considered a "browser" if the user can request licensed content using the mobile phone. The dynamic licensing mechanism 124 determines from a content provider the available licenses for content, and if the available licenses satisfy a licensing policy specified by the user, the dynamic licensing mechanism 124 can automatically acquire the needed license without input from the user after the initial request for the licensed content is made by the user. More details regarding the dynamic licensing mechanism are discussed below.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, browser 123, and dynamic licensing mechanism 124 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122.

Although computer system 100 is shown to contain only a single processor and a single system bus, those skilled in the art will appreciate that a dynamic licensing mechanism may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect computer system 100 to other computer systems or workstations 175 via network 170. Network interface 150 broadly represents any suitable way to interconnect electronic devices, regardless of whether the network 170 comprises present-day analog and/or digital techniques or via some networking mechanism of the future. Network interface 150 preferably includes a combination of hardware and software that allow communicating on the network 170. Software in the network interface 150 preferably includes a communication manager that manages communication with other computer systems 175 via network 170 using a suitable network protocol. Many different network protocols can be used to implement a network. These protocols are specialized computer programs that allow computers to communicate across a network. TCP/IP (Transmission Control Protocol/Internet Protocol) is an example of a suitable network protocol that may be used by the communication manager within the network interface 150.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
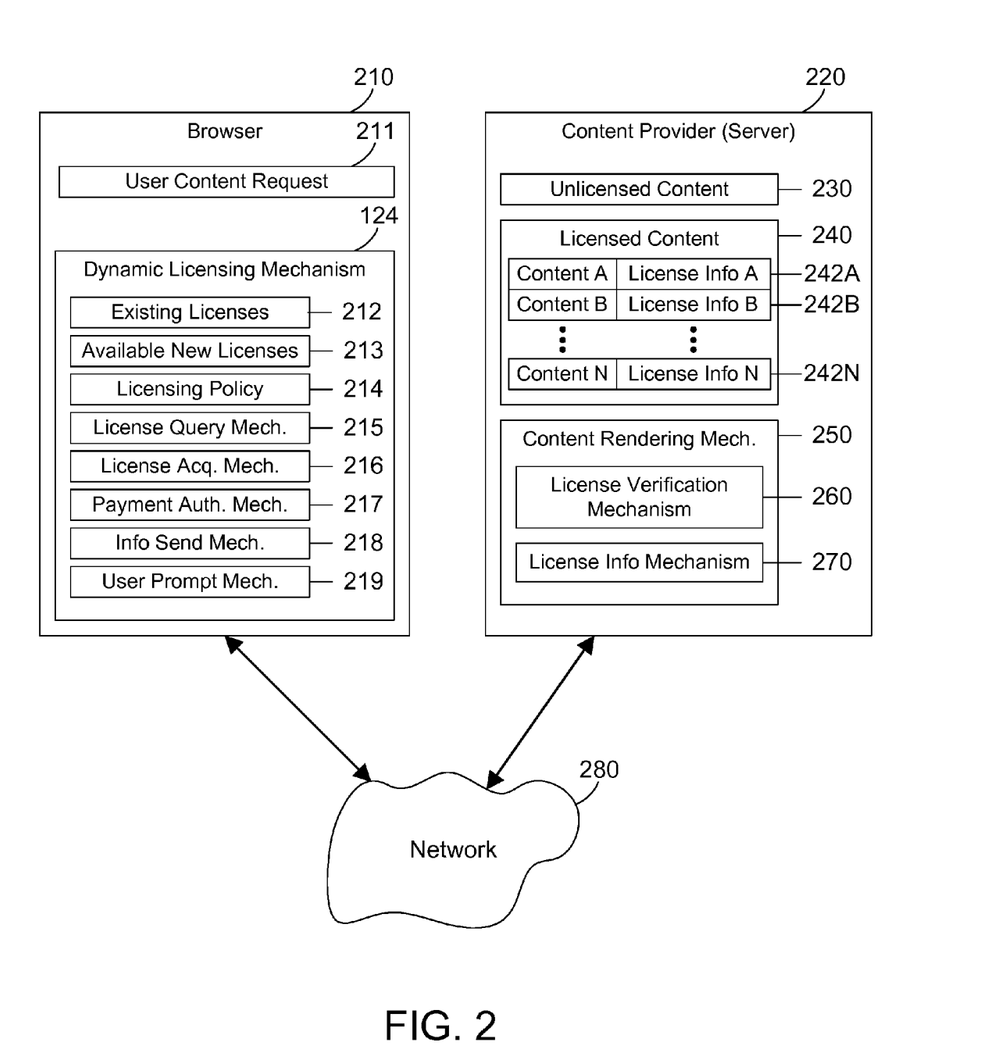
FIG. 2 is a block diagram that shows a browser coupled to a content provider via a network.

Referring to FIG. 2, a block diagram shows a system that allows delivery of content to a user using a dynamic licensing mechanism as disclosed herein. A browser 210 represents a user interface that allows a user to request content from a content provider 220. Browser 210 is one suitable representation of browser 123 in FIG. 1. The browser 210 and content provider 220 are coupled together via a network 280. Network 280 is one suitable representation for network 170 in FIG. 1, and may include a local area network, a wide area network, the Internet, etc. As discussed above, the browser may be any suitable interface for requesting content, whether using an existing web browser on a computer system, using a mobile phone, or using any other suitable device that is capable of downloading content from a content provider. A user content request 211 is specified by a user in the browser 210, and expressly extends to any suitable way for a user to request content, whether currently known or developed in the future. Details of the dynamic licensing mechanism 124 shown in FIG. 1 include existing licenses 212, available new licenses 213, a licensing policy 214, a license query mechanism 215, a license acquisition mechanism 216, a payment authorization mechanism 217, an information send mechanism 218, and a user prompt mechanism 219. Existing licenses 212 represent licenses the user already has for licensed content, and may include any suitable type of license, whether for one-time use, pay-per object, time-based license (daily, weekly, monthly, annually, etc.), bulk license, or any other suitable type of license. Available new licenses 213 represent licenses that are available to the user. The available new licenses 213 are preferably determined by the license query mechanism 215 querying the content provider 220 for license information related to licensed content. The licensing policy 214 is preferably specified by the user, and includes one or more criterion for automatically acquiring a license for licensed content without requiring further input from the user. More details of the licensing policy 214 are provided below. The license query mechanism 215 queries the content provider 220 to determine the license information relating to licensed content. The license query mechanism 215 preferably determines from the license information and from the existing licenses 212 the available new licenses 213 for content the user requests from the content provider 220. The license acquisition mechanism 216 is used to automatically acquire one or more licenses for licensed content requested by the user without requiring further input from the user. The license acquisition mechanism 216 automatically acquires the one or more licenses when the license information retrieved from the content provider 220 satisfies the criteria for automatically acquiring a license in the licensing policy 214. The payment authorization mechanism 217 is used to authorize payment when licensed content requires payment by the user. The payment authorization mechanism 217 preferably authorizes payment to the content provider 220 without requiring further input from the user. The information send mechanism 218 is used when a license for licensed content requires the user to send information to the content provider 220 in order to receive a license to the licensed content. For example, a content provider 220 may not charge anything for licensed content, but may require the user to provide the user's e-mail address in exchange for the licensed content so the content provider can send e-mails to the user regarding new content that becomes available. The user prompt mechanism 219 provides a way to prompt the user when the license information related to content requested by the user does not satisfy the licensing policy 214 specified by the user. The user, when prompted by the user prompt mechanism 219, may then select whether to authorize the delivery of the content even though the license information does not satisfy the licensing policy 214, or may select not to authorize delivery of the content.

The content provider 220 is typically a server computer system, and preferably includes unlicensed content 230 and licensed content 240. The licensed content 240 includes license information for each licensed content. Thus, for the simple example in FIG. 2, licensed content 240 includes content A with corresponding license information A at 242A, content B with corresponding license information B at 242B, . . . , content N with corresponding license information N at 242N. The content provider 220 also includes a content rendering mechanism 250 that renders content to a user when the content provider 220 receives a user content request 211 when the user has the necessary licenses to receive any licensed content that is included in the user content request 211. The content rendering mechanism 250 includes a license verification mechanism 260 that determines whether or not a user is licensed to access licensed content, and a license information mechanism 270 that provides license information regarding licensed content to the license query mechanism 215 in the user's browser 210.

A simple example will illustrate how the browser 210 interacts with the content provider 220 in FIG. 2. When a user enters a user content request 211, the browser 210 first sends the user content request 211 to the content rendering mechanism in the content provider 220. The license verification mechanism 260 then determines whether the user is licensed to receive licensed content (if any) that corresponds to the user content request 211. In one suitable implementation, the content provider 220 includes information regarding the existing licenses 212 for the user. In an alternative implementation, the dynamic licensing mechanism 124 may send the existing licenses 212 to the content provider 220. The license verification mechanism 260 determines whether the user is licensed to receive all content corresponding to the user content request 211. If so, the content rendering mechanism 250 renders the content corresponding to the user content request 211 to the user's browser 210. If the user is not licensed to receive all content corresponding to the user content request 211, the license query mechanism 215 queries the content provider 220 for license information. In response, the license information mechanism 270 sends license information (e.g., in 242A, 242B, . . . , 242N) that corresponds to licensed content corresponding to the user content request for which the user does not currently have a license. The license information returned by the license information mechanism 270 to the license query mechanism 215 preferably specifies the available new licenses 213. In the alternative, the license query mechanism 215 may process the license information received from the license information mechanism 270 to generate the available new licenses 213. The dynamic licensing mechanism 124 then determines whether the license information regarding available new licenses 213 satisfies the criterion or criteria specified in the licensing policy 214. When the license information regarding available new licenses 213 satisfies the licensing policy 214, the license acquisition mechanism 216 performs the necessary steps to receive one or more licenses to the licensed content corresponding to the user content request 211 for which the user is not currently licensed. Note the license acquisition mechanism 216 may use the payment authorization mechanism 217 and/or information send mechanism 218 to automatically acquire one or more licenses to the licensed content corresponding to the user content request 211 for which the user is not currently licensed, without requiring any further input from the user. Once the license acquisition mechanism 216 acquires any needed licenses, the license verification mechanism 260 verifies the user is now licensed to receive all the licensed content corresponding to the user content request 211, and in response the content rendering mechanism 250 renders the requested content to the user's browser 210. Note if the license information received by the license query mechanism 215 does not satisfy the licensing policy specified by the user, the user prompt mechanism 219 may prompt the user and allow the user to authorize the license for the licensed content even though the license information does not satisfy the licensing policy 214.

Figure 3:
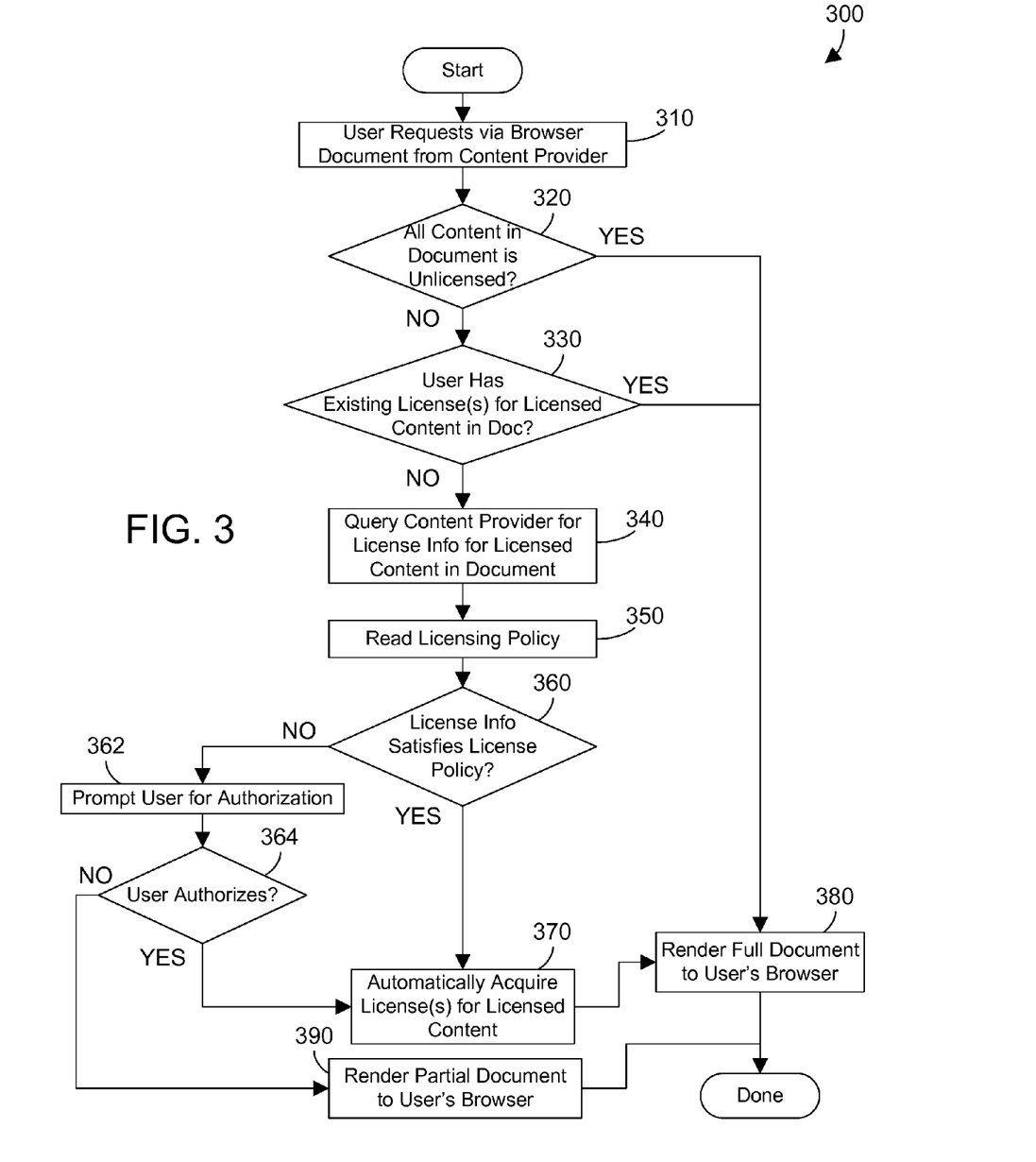
FIG. 3 is a flow diagram of a method for delivering licensed content to a user.

Referring to FIG. 3, a method 300 begins when a user requests via a browser a document from a content provider (step 310). Note this specific example in FIG. 3 assumes a document, such as a web page, is requested by a user, which may include one or more portions that are licensed. If all content in the document requested by the user is unlicensed (step 320=YES), the content provider renders the full document to the user's browser (step 380). If some of the content in the document is licensed (step 320=NO), and if the user has existing license(s) for the licensed content in the document (step 330=YES), the content provider renders the full document to the user's browser (step 380). If some content in the document is licensed (step 320=NO) and the user does not have existing licenses for all licensed content in the document (step 330=NO), the content provider is queried for license information for the licensed content in the document (step 340). The licensing policy specified by the user is then read (step 350). When the license information received from the content provider satisfies the license policy (step 360=YES), any needed license for the licensed content is automatically acquired without further interaction by the user (step 370), after which the content provider renders the full document to the user's browser (step 380). When the license information does not satisfy the license policy (step 360=NO), the user may be prompted for authorization (step 362). If the user authorizes the acquisition of the license when prompted (step 364=YES), any needed licenses for the licensed content are automatically acquired without further input from the user (step 370), and the content provider renders the full document to the user's browser (step 380). If the user does not authorize when prompted (step 364=NO), the content provider renders a partial document to the user's browser that does not include any content for which the user did not provide authorization. Note an alternative to step 390 is for the content provider not to provide any of the document to the user, but to provide instead an error message that the user is not licensed to receive all of the content in the document. Note also that steps 362 and 364 are optional, and need not necessarily be performed.

Figure 4:
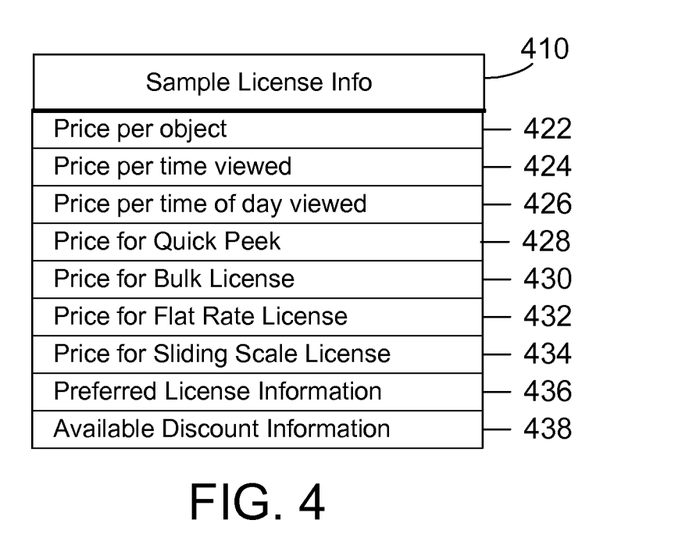
FIG. 4 shows sample license information.

Referring to FIG. 4, sample license information 410 is shown. The dynamic licensing of information as disclosed herein may involve any suitable type of license information. For example, the sample license information 410 may include delivery of content based on micropayments. Thus, the license information 410 may include a price per object 422, such as $0.05 every time the object is viewed, downloaded or otherwise received. The license information 410 may include a price per time viewed 424. For example, the user may be charged $0.10 per minute for viewing an object. The license information may also include different prices depending on the time of day the object is received 426. For example, an object might have a price of $0.10 during peak times and a price of $0.05 during off-peak times. In addition, the license information 410 may include a price for a "Quick Peek" 428 of the licensed content. For example, a "quick peek" could have a price of $0.10 which allows a 10 second view of the object, while full access to the object is priced at $1.00. The license information 410 may also include a price for bulk licensing 430. For example, a user may agree to a contract with a particular provider to be able to receive all content originating from that provider. Note that this method may be combined with other licensing criteria associated with content delivered from different providers as described above (e.g. per object, etc.). Also note that a provider may want to deliver some content in bulk but other content according to other licensing schemes.

The license information 410 may also include a price for a flat rate license 432. For example, a flat rate of $19.99 per month could license the user to receive a particular kind or set of content. The license information 434 may also include a price for a sliding scale license 434. For example, a particular content provider may offer content delivery at the rate of $0.25 per object, but may drop the price to $0.10 per object once a user retrieves a certain amount of content from the provider (e.g., 50 objects). The license information 410 may include preferred license information 436. For example, if the user already has a flat rate license with the Institute of Electrical and Electronic Engineers (IEEE), when requesting technical information the user would like it to be retrieved from IEEE as opposed to utilizing other licenses (such as micropayment) from different providers that would incur a cost for the same content. The license information 410 may also include available discount information (step 438). Available discounts could be provided based on any suitable criteria. For example, the content provider could provide a discount based on the browser and its plugins. Thus, if the browser includes a plugin that limits copying of content, the user may be eligible for a discount. If the browser includes features for delivering content to a person who is visually-impaired, a discount might be available based on delivering non-visual content in a document and not delivering visual content such as images.

The sample license information 410 shown in FIG. 4 is not an exhaustive list, and is not limiting but is shown by way of example. Note, however, the license information relating to licensed content may be any suitable criteria or heuristic. Any or all of the various criteria shown in FIG. 4, or any suitable combination of those criteria or other criteria, could be applied to any licensed content. Thus, the license information corresponding to content A at 242A in FIG. 2, could include any combination of license information shown in FIG. 4 or other license information. The same is true of license information at 242B through 242N in FIG. 2, as the simple example below illustrates.

Figure 5:
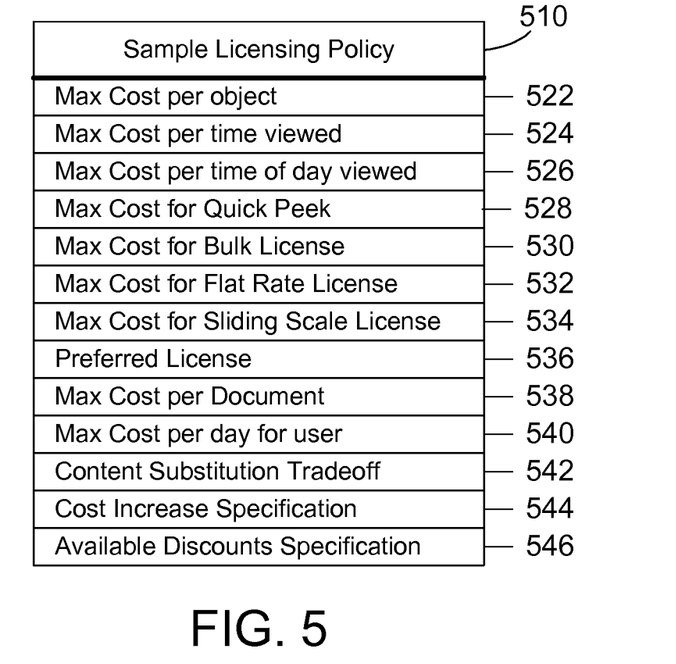
FIG. 5 shows sample information that may be included in the licensing policy.

Referring to FIG. 5, a sample licensing policy 510 shows various criteria that could be specified by the user in the licensing policy 214 shown in FIG. 2. The user could specify any or all of the following criteria in a licensing policy: a maximum cost per object 522; a maximum cost per time viewed 524; a maximum cost per time of day received 526; a maximum cost for a quick peek 528; a maximum cost for a bulk license 530; a maximum cost for a flat rate license 532; a maximum cost for a sliding scale license 534; a preferred license specification 536; a maximum cost per document 538; a maximum cost per day for the user 540; a content substitution tradeoff 542; a cost increase specification 544, and an available discounts specification 546. Items 520-536 may be understood with reference to the discussion of items 420-436 in FIG. 4 above. The maximum cost per document 538 allows a user to specify a maximum cost for a document. For example, if the user specifies a maximum cost of $1.00 for a document, and the least expensive price for available licenses exceeds this $1.00 maximum, the license information for the document does not satisfy the licensing policy specified by the user. The maximum cost per day for the user 540 allows a user to specify how much the user is willing to spend on content in a given day. Thus, let's assume a user sets the maximum cost per day 540 at $3.00, and the user has already spent $2.90. If the licensed content in the next document requested by the user has a price of more than $0.10, the license information for the licensed content would no longer satisfy the sample licensing policy because the total would exceed the maximum cost per day of $3.00 specified by the user in the licensing policy. Note the maximum cost per day 540 shown in FIG. 5 is one suitable example of a maximum cost per time period for a user, where the time period can be any suitable time period denominated in any suitable time unit, including seconds, hours, days, weeks months, years, decades, etc.

The sample licensing policy 510 also includes a content substitution tradeoff 542. For example, if more than one version of content can be used in a document, the user may choose to select a less expensive version in order to keep costs for the document down. For example, if lower resolution images have a lower license fee, the user can select to utilize them when possible. Other substitutions may also apply such as monochromatic images, public stock photos, etc. The sample licensing policy 510 also includes a cost increase specification 544 that may specify a sliding scale for licensed content the user may want to retrieve. For example, what can the user see for $0.10, $0.25, or $1.00? The user can view a lower cost version first, and increase the fees to see more, incrementally. The sample licensing policy 510 also includes an available discounts specification 546. For example, if the user has impaired vision, the available discounts specification may specify to only deliver content when the content provider is willing not to charge for visual content, such as images.

The various criteria shown in the sample licensing policy 510 in FIG. 5 is not an exhaustive list, and is not limiting. The sample licensing policy 510 shown in FIG. 5 is shown by way of example. Sample licensing policy 510 shows various criteria that could be specified by the user in the licensing policy 214 shown in FIG. 2. Any or all of the various criteria shown in FIG. 5, or any suitable combination of those criteria or other criteria, could be specified by a user in the licensing policy 214.

Figure 6:
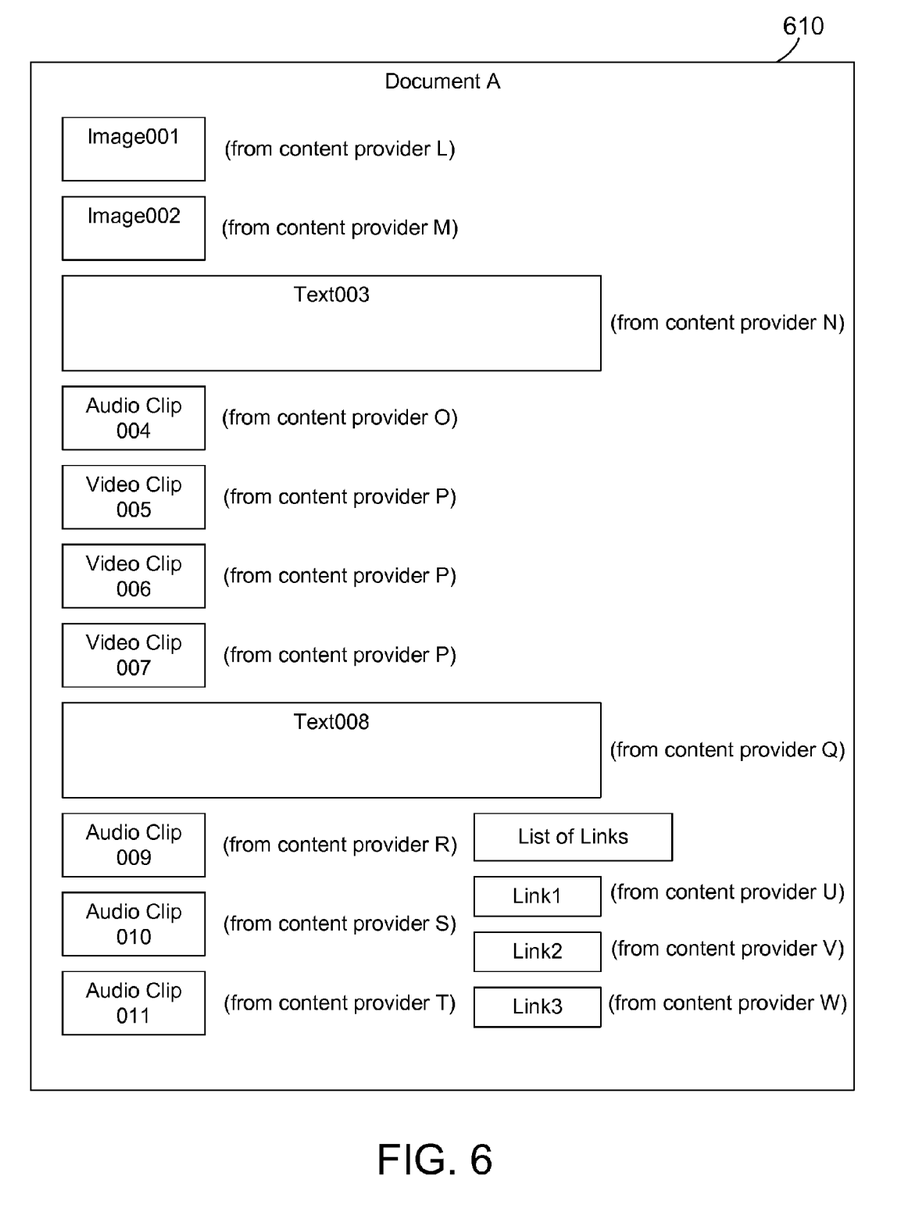
FIG. 6 is a block diagram of a sample document.

A specific example is now given to explain many of the concepts discussed above with reference to FIGS. 1-5. Referring to FIG. 6, we assume a document A 610 at a content provider includes many different content portions provided by many different content providers. Document A could be, for example, a web page provided by a news organization. Image001 is provided by content provider L; Image002 by content provider M; Text003 by content provider N; Audio Clip 004 from content provider O; Video Clips 005, 006 and 007 from content provider P; Text008 from content provider Q; Audio Clip 009 from content provider R; Audio Clip 010 from content provider S; Audio Clip 011 from content provider T; Link1 from content provider U; Link2 from content provider V; and Link3 from content provider W. We assume for this example Link1, Link2 and Link3 are links that, when selected by the user, provide licensed content to the user.

Figure 7:
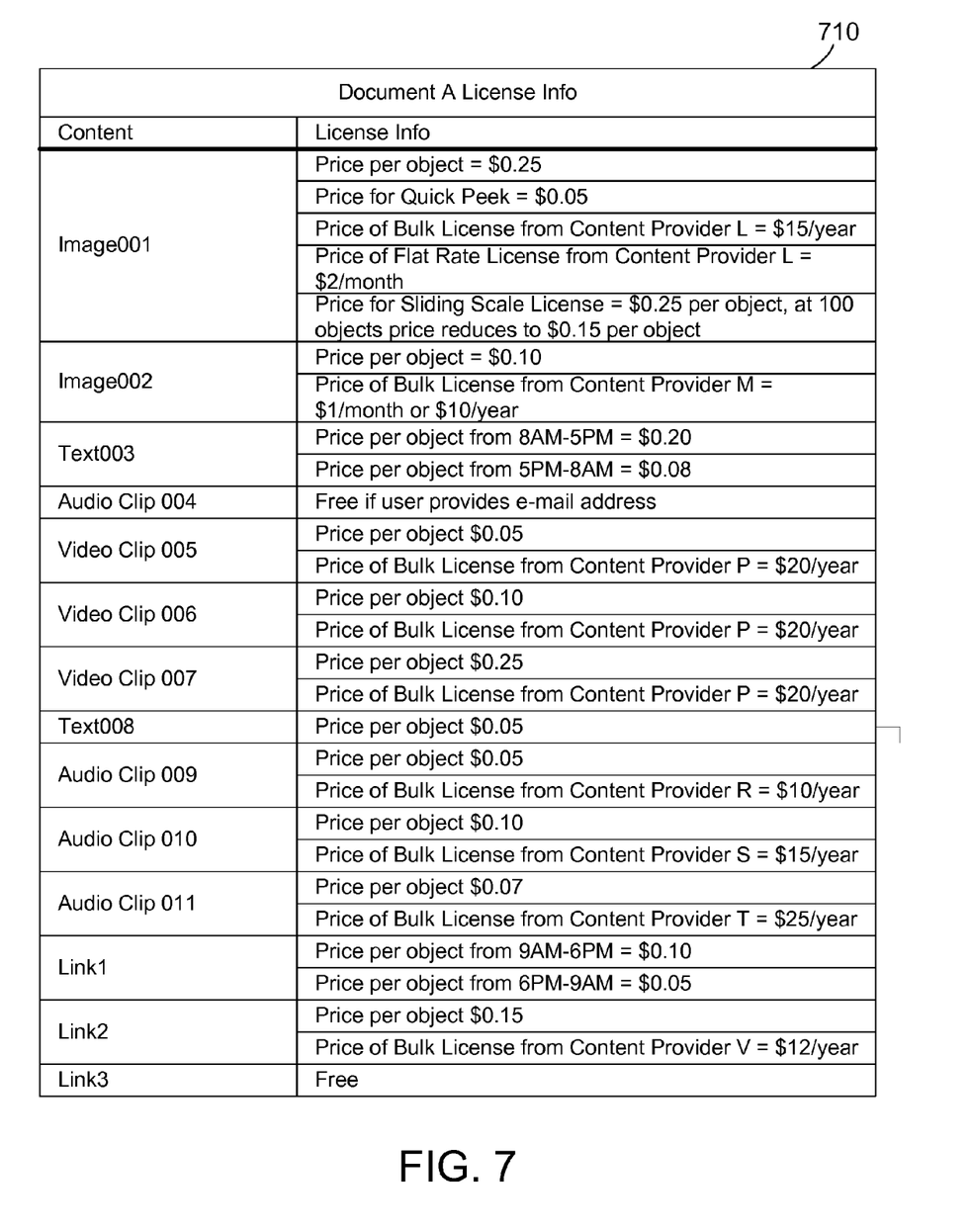
FIG. 7 shows sample licensing information for the content in the sample document in FIG. 6.

License information for all the content in document A is shown at 710 in FIG. 7. The license information 710 corresponds to the content/license information pairs shown at 242A, 242B, . . . , 242N in FIG. 2. Image001 includes many different license options as shown in the license information. The license information for Image001 includes price per object of $0.25, price for a Quick Peak at $0.05, price of a bulk license from Content Provider L at $15/year, price of a flat rate license from Content Provider L at $2 per month, and price for a sliding scale license from content provider L at $0.25 per object, but once the user has paid for 100 objects, the price reduces to $0.15 per object. The license information for Image002 includes price per object of $0.10, and price of a bulk license from Content Provider M at $1 per month or $10 per year. The license information for Text003 includes price per object from 8 AM to 5 PM of $0.20, and price per object from 5 PM to 8 AM at $0.08. The license information for Audio Clip 004 indicates the audio clip is free in exchange for the user providing his or her e-mail address. The license information for Video Clip 005 indicates a price per object of $0.05, and a price of a bulk license from Content Provider P at $20 per year. The license information for Video Clip 006 indicates a price per object of $0.10, and a price of a bulk license from Content Provider P at $20 per year. The license information for Video Clip 007 indicates a price per object of $0.25, and a price of a bulk license from Content Provider P at $20 per year. We assume for this example that the video clips 005, 006 and 007 are similar clips that have different prices depending on the length and/or quality of the video. For example, Video Clip 005 might be a two minute portion of an interview, while Video Clip 006 is a four minute portion of the same video and Video Clip 007 is the entire twelve minute video. In the alternative, Video Clip 005 could be a low-resolution video clip, Video Clip 006 could be a medium-resolution video clip, and Video Clip 007 is a high-resolution video clip, all of the same clip.

The license information for Text008 includes a price per object of $0.05. The license information for Audio Clip 009 indicates a price per object of $0.05, and a price of a bulk license from Content Provider R at $10 per year. The license information for Audio Clip 010 indicates a price per object of $0.10, and a price of a bulk license from Content Provider S at $15 per year. The license information for Audio Clip 011 indicates a price per object f $0.07, and a price of a bulk license from Content Provider T at $25 per year. The license information for Link1 indicates a price per object from 9 AM to 6 PM of $0.10, and a price per object from 6 PM to 9 AM of $0.05. The license information for Link2 indicates a price per object of $0.15 and a price of a bulk license from Content Provider V at $12 per year. The license information for Link3 indicates the link is free.

Figure 8:
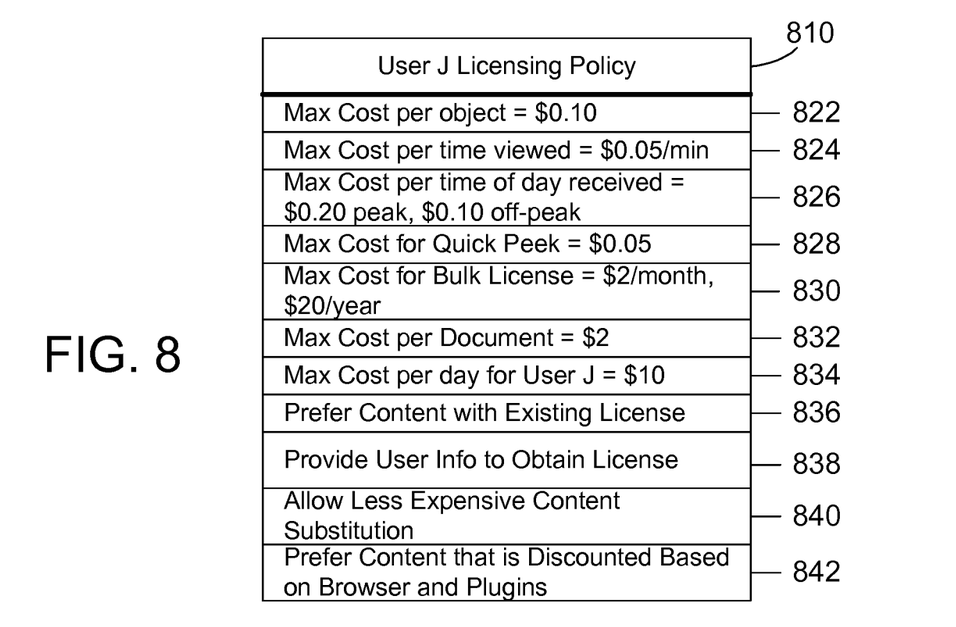
FIG. 8 is one specific example of a licensing policy for User J.

Referring to FIG. 8, a licensing policy 810 for a user J is shown to include many criteria. The maximum cost per object is $0.10 at 820. The maximum cost per object is $0.10 at 822. The maximum cost per time viewed is $0.05 per minute at 824. The maximum cost per time of day received is $0.20 peak and $0.10 off-peak at 826. The maximum cost for a quick peek is $0.05 at 828. The maximum cost for a bulk license is $2 per month or $20 per year at 830. The maximum cost per document is $2 at 832. The maximum cost per day for User J is $10 at 834. Content with an existing license is preferred at 836. User information may be provided to obtain a license at 838. Less expensive content substitution is allowed at 840. And content that is discounted based on browser and plugins is preferred at 842.

We assume for this example the User J requests Document A from the content provider at 5:30 PM. The dynamic licensing mechanism determines whether the license information in FIG. 7 satisfies the criteria specified in the User J Licensing Policy 810 in FIG. 8. For Image001, the price per object of $0.25 is greater than the maximum cost per object of $0.10, but the price for a quick peek of $0.05 satisfies the maximum cost for a quick peak of $0.05 at 828 in the licensing policy 810, so the dynamic licensing mechanism automatically authorizes payment of $0.05 for a Quick Peek at Image001 and acquires a license for a quick peek at Image001. We assume for this example a Quick Peek lasts for ten seconds. For Image002, the price per object of $0.10 satisfies the maximum cost per object of $0.10 at 820 in the licensing policy 810, so the dynamic licensing mechanism automatically authorizes payment of $0.10 for a license to receive Image002. For Text003, because the time the user requests Document A is 5:30 PM, the price per object for Text003 is $0.08, which satisfies the maximum cost per object of $0.10 at 820 in the licensing policy 810, so the dynamic licensing mechanism automatically authorizes payment of $0.08 to receive a license to receive Text003. For Audio Clip 004, the license is free if the user provides the user's e-mail address. Because the licensing policy 810 specifies to provide user information to obtain a license at 838, the dynamic licensing mechanism sends the user's e-mail address, and in response, acquires a license to Audio Clip 004. For Video Clips 005, 006 and 007, we assume these three are provided by the same Content Provider P, and represent the same video clip with Video Clip 005 being low-resolution, Video Clip 006 being medium-resolution, and Video Clip 007 being high-resolution. Because the licensing policy 810 specifies to allow less expensive content substitution at 840, and because the cost for the least expensive of the three video clips is $0.05 for the low resolution Video Clip 005, which is less than the maximum cost per object of $0.10 at 820 in the licensing policy 810, the dynamic licensing mechanism automatically authorizes payment of $0.05 to receive a license to view Video Clip 005.

For Text008, the price per object of $0.05 is less than the maximum cost per object of $0.10 at 820 in the licensing policy 810, so the dynamic licensing mechanism automatically authorizes payment of $0.05 to receive a license to receive Text008. For Audio Clip 009, the price per object of $0.05 is less than the maximum cost per object of $0.10 at 820 in the licensing policy 810, so the dynamic licensing mechanism automatically authorizes payment of $0.05 to receive a license to receive Audio Clip 009. For Audio Clip 010, the price per object of $0.10 satisfies the maximum cost per object of $0.10 at 820 in the licensing policy 810, so the dynamic licensing mechanism automatically authorizes payment of $0.10 to receive a license to receive Audio Clip 010. For Audio Clip 011, the price per object of $0.07 is less than the maximum cost per object of $0.10 at 820 in the licensing policy 810, so the dynamic licensing mechanism automatically authorizes payment of $0.07 to receive a license to receive Audio Clip 011. For Link1, because the time Document A was requested is 5:30 PM, the price per object of $0.10 satisfies the maximum cost per object of $0.10 at 820 in the licensing policy 810, so the dynamic licensing mechanism automatically authorizes payment of $0.10 to receive a license to receive Link1. For Link2, the price per object of $0.15 exceeds the maximum cost per object of $0.10 at 820 in the licensing policy 810, so the dynamic licensing mechanism does not acquire a license to receive Link2. For Link3, the license information indicates the link is free without conditions, so the user may either acquire a license to receive Link3, or the content provider can provide Link3 to all users because Link3 is free without conditions.

Figure 10:
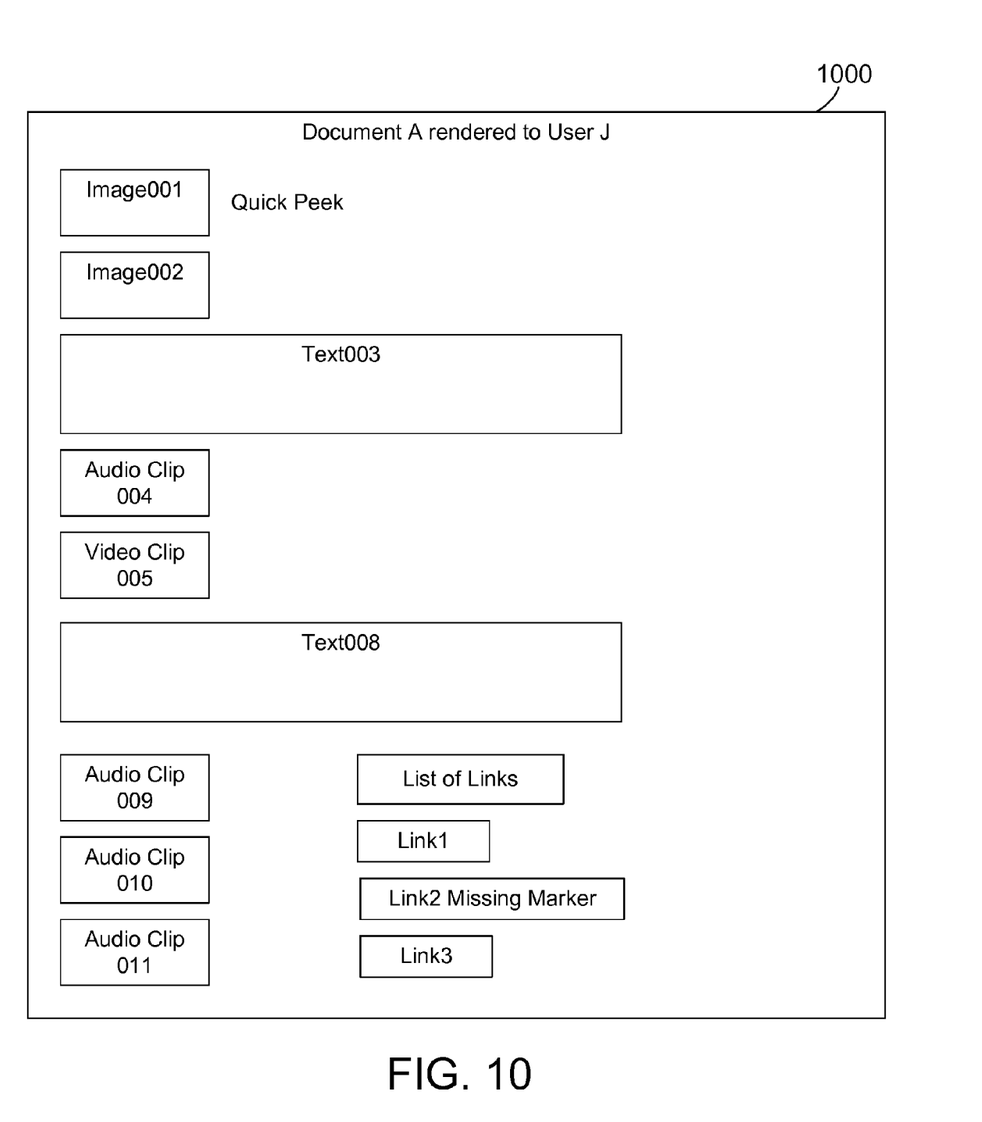
FIG. 10 shows Document A rendered to User J.

The resulting document 1000 that is rendered to User J is shown in FIG. 10. We assume for this example User J was prompted that Link2 did not satisfy the criteria in the licensing policy 810 (see step 362 in FIG. 3), and the user did not authorize payment for Link2 (step 364=NO in FIG. 3). Link2 is not included in document 1000 because the licensing policy 810 was not satisfied by the license information for Link2 and the user did not authorize payment for Link2 when prompted. As a result, document 1000 represents a partial document that would be rendered to User J at step 390 in FIG. 3. In one specific implementation, the content provider could render document 1000 without Link2 in a way that the user will not realize the link is missing. In the specific implementation shown in FIG. 10, a marker "Link2 Missing Marker" indicating Link2 is missing is included in the document to convey to User J that some content in the document was not rendered because the user was not licensed to receive the content. Note the marker could include a link with a price for the missing content so the user could click on the link to download the missing content to the document.

Figure 9:
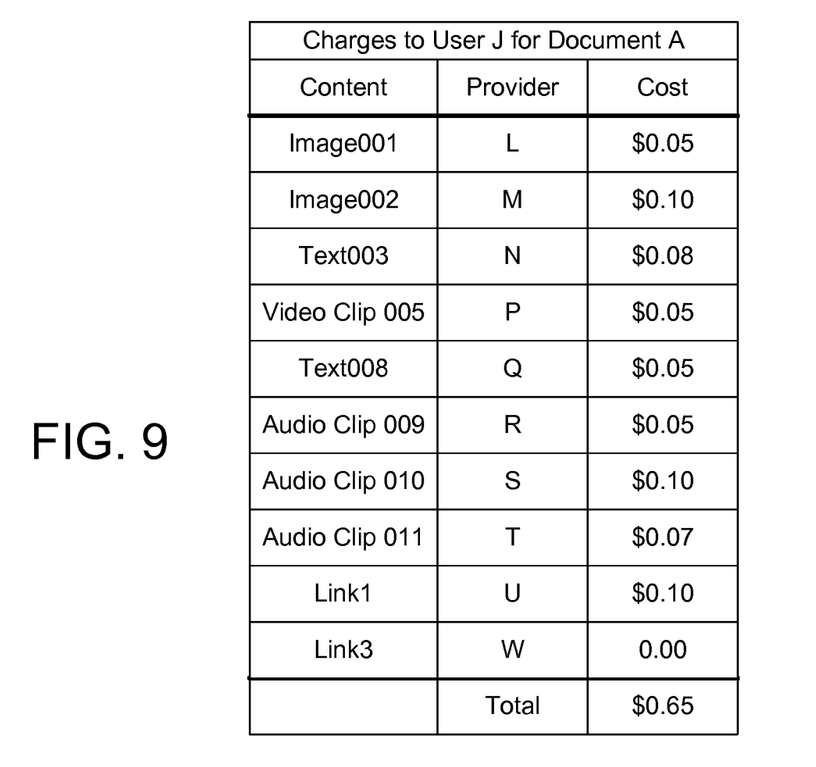
FIG. 9 is a table that shows charges to User J for receiving Document A shown in FIG. 10.

A summary of the charges to User J for receiving Document A are shown in the table in FIG. 9. Thus, the user will pay $0.65 to view Document A. In one specific implementation, the content provider that provides Document A will provide the licenses from all the license providers to User J. This provides an opportunity for the content provider of Document A to increase the charges for providing a value-added service of providing content from the various providers. Thus, while the price of Image002 to User J is $0.10, the content provider that provides Document A might keep $0.04 while paying Content Provider M $0.06 for providing Image002 to User J. In a different implementation, the dynamic licensing mechanism could query individual content providers and request and receive licenses from those providers directly, with the provider of Document A simply verifying User J has the necessary licenses from the various content providers before rendering the licensed content to User J.

While the specific example in the figures and discussed above shows a single content provider 220 providing a document that includes content from multiple content providers, the disclosure and claims herein expressly extend to the user receiving licensed content from multiple content providers at the same time. Thus, the various portions of Document A rendered to the user could be retrieved from the different content providers instead of from a single content provider.

One possible specific use for the dynamic licensing mechanism disclosed herein is for digital newspapers. Digital paper is well-known, and allows downloading text and images in a manner that remains on the digital paper after power is removed. A user could define a licensing policy that determines how much the user is willing to pay for content that is downloaded to the user's digital newspaper. When the user downloads information to the digital paper, the news provider would only provide the content to the digital paper that satisfies the licensing policy, and other content would not be downloaded to the digital paper. Another specific application is electronic readers or notepads that allows a user to receive information from content providers. Of course, another application is for a user to access a web page via a web browser on a computer. Yet another application is for a user to access licensed content on the user's mobile phone. Yet another application is for a user of a content management system to receive a document that includes licensed content from the repository of content managed by the content management system. The disclosure and claims herein extend to any suitable manner for a user to request licensed content from one or more content providers.

Yet another specific implementation for the dynamic licensing mechanism disclosed herein is for users that have special needs, such as those who are visually-impaired or hearing-impaired. For example, a user that is hearing-impaired could download a plugin for their browser that indicates the user does not need to receive audio content, and the user could also specify in the licensing policy not to authorize charges for any audio content. Content providers could then specifically target the hearing-impaired by recognizing the plugin that indicates the user is hearing-impaired, and providing discounts for content based on the plugin. Of course, the same functionality could be achieved by the user explicitly specifying preferences in the licensing policy, such as not paying for audio content.

Note the dynamic licensing mechanism may also include intelligence that helps to minimize cost for licensed content based on past use. For example, if the user has accessed 40 different objects for $0.10 each in the past week, the dynamic licensing mechanism may determine it will be more cost-beneficial in the long run to get a bulk license instead of paying per-object. In addition, the dynamic licensing mechanism could shop around to different content providers to see if identical or compatible content is available at a lower cost from a different content provider.

The licensing policy could also be specific to a user's role or interests. For example, one licensing policy for work and a different licensing policy for personal use could be defined with different criteria. In the alternative, a licensing policy could be defined for different areas of interest. Thus, a user might define one licensing policy for entertainment, and a different licensing policy for news. The disclosure and claims herein expressly extend to a user defining multiple licensing policies.

The dynamic licensing mechanism disclosed herein can automatically request and receive licenses for licensed content when one or more criterion in a licensing policy is satisfied by license information relating to the licensed content, without the user providing any further input to acquire the licenses. When the criteria in the licensing policy is not satisfied, the user may be prompted for authorization to obtain a license. If the user authorizes, the dynamic licensing mechanism then acquires the license. If the user does not authorize the acquisition of the license, the licensed content is not provided to the user.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:
1. An apparatus comprising:
at least one processor;
a memory coupled to the at least one processor;

a browser residing in the memory and executed by the at least one processor that provides an interface for a user to request licensed content;

a licensing policy residing in the memory and defined by the user that specifies at least one criterion for automatically acquiring at least one license; and a dynamic licensing mechanism that requests the licensed content from a content provider in response to the user requesting the licensed content via the browser, queries the content provider for license information for the licensed content that specifies at least one available license for the licensed content, and when the license information satisfies the at least one criterion in the licensing policy, the dynamic licensing mechanism acquires a license for the licensed content without requiring further input from the user, allowing the user to received the licensed content, and when the license information does not satisfy the at least one criterion in the licensing policy, the dynamic licensing mechanism prompts the user for authorization to acquire the license for the licensed content.

2. The apparatus of claim 1 wherein the dynamic licensing mechanism comprises a payment authorization mechanism that authorizes payment to the content provider in exchange for the license for the licensed content.

3. The apparatus of claim 1 wherein the dynamic licensing mechanism further comprises an information send mechanism that sends information from the user to the content provider in exchange for the license to the licensed content.

4. The apparatus of claim 1 wherein the license policy specifies maximum cost for the licensed content.

5. The apparatus of claim 1 wherein the license policy specifies maximum cost for a document that includes the licensed content.

6. The apparatus of claim 1 wherein the license policy specifies maximum cost per time period for the user.

7. The apparatus of claim 1 wherein the license policy specifies maximum cost to download the licensed content, maximum cost per unit of time the licensed content is viewed, maximum cost for the licensed content according to time of day the licensed content is received, maximum cost to receive the licensed content for a limited period of time, maximum cost for a bulk license for the licensed content, maximum cost for a flat rate license for the licensed content, maximum cost for a sliding scale license for the licensed content, a preferred license for the licensed content, maximum cost per document that includes the licensed content, maximum cost per time period for the user, whether content substation is allowed according to cost, what an increase in cost will provide to the user, and available discounts for the licensed content.

8. A computer-implemented method for a user to receive licensed content from at least one content provider, the method comprising the steps of:
providing at least one processor;
providing a memory coupled to the at least one processor;
the at least one processor performing the steps of:
a user defining a license policy that specifies at least one criterion for automatically acquiring at least one license;
receiving a request from the user for the licensed content;
sending the request for the licensed content to the at least one content provider;
querying the at least one content provider for license information for the licensed content;
determining when the license information satisfies the at least one criterion in the licensing policy, and in response, acquiring a license for the licensed content without requiring further input from the user;
the user receiving the licensed content from the at least one content provider; and
determining when the license information does not satisfy the at least one criterion in the licensing policy, and in response, prompting the user for authorization to acquire the license for the licensed content.

9. The method of claim 8 wherein the acquiring the license for the licensed content comprises authorizing payment to the at least one content provider in exchange for the license for the licensed content.

10. The method of claim 8 further comprising the step of sending information from the user to the content provider in exchange for the license to the licensed content.

11. The method of claim 8 wherein the license policy specifies maximum cost for the licensed content.

12. The method of claim 8 wherein the license policy specifies maximum cost for a document that includes the licensed content.

13. The method of claim 8 wherein the license policy specifies maximum cost per time period for the user.

14. The method of claim 8 wherein the license policy specifies maximum cost to download the licensed content, maximum cost per unit of time the licensed content is viewed, maximum cost for the licensed content according to time of day the licensed content is received, maximum cost to receive the licensed content for a limited period of time, maximum cost for a bulk license for the licensed content, maximum cost for a flat rate license for the licensed content, maximum cost for a sliding scale license for the licensed content, a preferred license for the licensed content, maximum cost per document that includes the licensed content, maximum cost per time period for the user, whether content substation is allowed according to cost, what an increase in cost will provide to the user, and available discounts for the licensed content.

15. An article of manufacture comprising software stored on non-transitory recordable media, the software comprising:
a dynamic licensing mechanism that, when executed by at least one processor, requests licensed content from a content provider in response to a user requesting the licensed content via a browser, queries the content provider for license information for the licensed content that specifies at least one available license for the licensed content, and when the license information satisfies at least one criterion in a licensing policy defined by the user for automatically acquiring at least one license, the dynamic licensing mechanism acquires a license for the licensed content without requiring further input from the user, allowing the user to received the licensed content, and when the license information does not satisfy the at least one criterion in the licensing policy, the dynamic licensing mechanism prompts the user for authorization to acquire the license for the licensed content.

16. The article of manufacture of claim 15 wherein the dynamic licensing mechanism comprises a payment authorization mechanism that authorizes payment to the content provider in exchange for the license for the licensed content.

17. The article of manufacture of claim 15 wherein the dynamic licensing mechanism further comprises an information send mechanism that sends information from the user to the content provider in exchange for the license to the licensed content.

18. The article of manufacture of claim 15 wherein the license policy specifies maximum cost for the licensed content.

19. The article of manufacture of claim 15 wherein the license policy specifies maximum cost for a document that includes the licensed content.

20. The article of manufacture of claim 15 wherein the license policy specifies maximum cost per time period for the user.

21. The article of manufacture of claim 15 wherein the license policy specifies maximum cost to download the licensed content, maximum cost per unit of time the licensed content is viewed, maximum cost for the licensed content according to time of day the licensed content is received, maximum cost to receive the licensed content for a limited period of time, maximum cost for a bulk license for the licensed content, maximum cost for a flat rate license for the licensed content, maximum cost for a sliding scale license for the licensed content, a preferred license for the licensed content, maximum cost per document that includes the licensed content, maximum cost per time period for the user, whether content substation is allowed according to cost, what an increase in cost will provide to the user, and available discounts for the licensed content.

* * * * *